United States Patent
Nishii et al.

(10) Patent No.: US 9,404,555 B2
(45) Date of Patent: Aug. 2, 2016

(54) CENTRIFUGAL PENDULUM DAMPING DEVICE

(71) Applicant: HONDA MOTOR CO., LTD., Tokyo (JP)

(72) Inventors: Fumiya Nishii, Wako (JP); Kazuhiko Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/441,994

(22) PCT Filed: Nov. 8, 2013

(86) PCT No.: PCT/JP2013/080212
§ 371 (c)(1),
(2) Date: May 11, 2015

(87) PCT Pub. No.: WO2014/080776
PCT Pub. Date: May 30, 2014

(65) Prior Publication Data
US 2015/0292594 A1    Oct. 15, 2015

(30) Foreign Application Priority Data
Nov. 26, 2012    (JP) ................................. 2012-257041

(51) Int. Cl.
*F16F 15/14*    (2006.01)
(52) U.S. Cl.
CPC .................................. *F16F 15/145* (2013.01)
(58) Field of Classification Search
CPC ........... F16F 7/10; F16F 15/14; F16F 15/145; Y10T 74/2128
See application file for complete search history.

(56) References Cited

U.S. PATENT DOCUMENTS

| 9,243,681 B2 * | 1/2016 | Movlazada ............. F16F 15/14 |
| 2002/0078791 A1 | 6/2002 | Eckel et al. |
| 2010/0122605 A1 * | 5/2010 | Maienschein ....... F16F 15/1457 74/574.2 |

(Continued)

FOREIGN PATENT DOCUMENTS

| CN | 102245936 A | 11/2011 |
| DE | 10005545 A1 | 8/2001 |

(Continued)

OTHER PUBLICATIONS

International Search Report dated Feb. 10, 2014, issued in corresponding application No. PCT/JP2013/080212.

(Continued)

*Primary Examiner* — Adam D Rogers
(74) *Attorney, Agent, or Firm* — Westerman, Hattori, Daniels & Adrian, LLP

(57) ABSTRACT

A centrifugal pendulum damping device includes a support body provided with a pair of first curved tracks and fixed to a rotating shaft, inertial masses provided with a pair of second curved tracks and supported on an outer peripheral part of the support body, and pins rollably fitted in a section where a first and second curved track intersect each other. Since the shapes of the pair of first curved tracks are different from each other and the shapes of the pair of second curved tracks are different from each other, the inertial mass moves rotationally and translationally in the peripheral direction of the support body, which improves damping low frequency vibration performance. Since the inertial mass moves rotationally, it is less likely to extend outside the region of the support body.

4 Claims, 9 Drawing Sheets

(56) References Cited

U.S. PATENT DOCUMENTS

| | | | | |
|---|---|---|---|---|
| 2012/0055281 A1* | 3/2012 | Huegel | F16F 15/145 74/574.2 |
| 2013/0283967 A1* | 10/2013 | Movlazada | F16F 15/145 74/574.2 |
| 2013/0305876 A1* | 11/2013 | Schnaedelbach | F16F 15/145 74/574.2 |
| 2015/0323041 A1* | 11/2015 | Takikawa | F16F 15/145 192/3.29 |

FOREIGN PATENT DOCUMENTS

| | | | | |
|---|---|---|---|---|
| DE | 102011087555 A1 | 9/2012 | | |
| DE | WO 2015058766 A1 * | 4/2015 | | F16F 15/145 |
| DE | 102014203061 A1 * | 8/2015 | | F16D 3/12 |
| DE | 102014208777 A1 * | 11/2015 | | F16F 15/14 |
| GB | 2354055 A | 3/2001 | | |
| JP | 10-184799 A | 7/1998 | | |
| JP | 2000-314451 A | 11/2000 | | |
| JP | 2001-271885 A | 10/2001 | | |
| JP | 3221866 B2 | 10/2001 | | |
| WO | 2008/098536 A2 | 8/2008 | | |
| WO | 2012/089190 A2 | 7/2012 | | |

OTHER PUBLICATIONS

Chinese Office Action dated Nov. 30, 2015 for Chinese Patent Application No. 201380060921.0, (6 pages).

* cited by examiner

CENTRIFUGAL PENDULUM DAMPING DEVICE

TECHNICAL FIELD

The present invention relates to a centrifugal pendulum damping device in which a plurality of inertial masses are supported on a support body rotating together with a rotating shaft, and the inertial masses undergo pendular oscillation according to rotational variation of the rotating shaft to thus exhibit a damping function.

BACKGROUND ART

Such a centrifugal pendulum damping device in which the damping function is improved by rollably fitting a pin in a pair of first curved tracks provided on a rotating support body and a pair of second curved tracks provided on an inertial mass and by making the inertial mass undergo pendular oscillation along an arc-shaped trajectory in which the radius of curvature changes, thus making the natural frequency of oscillation of the inertial mass be always constant regardless of the amplitude, is known from Patent Document 1 below.

Furthermore, such a centrifugal pendulum damping device in which an inertial mass is supported so that it can undergo pendular oscillation on a support body to which rotation of a rotating shaft increased by a speed-increasing device is transmitted, and the natural frequency of oscillation of the inertial mass is made to follow the input vibrational frequency when the rotating shaft rotates at a low speed while keeping the radius of the support body and the mass of the inertial mass low to ensure that there is a damping function is known from Patent Document 2 below.

RELATED ART DOCUMENTS

Patent Documents

Patent Document 1: Japanese Patent No. 3221866
Patent Document 2: Japanese Patent Application Laid-open No. 10-184799

SUMMARY OF THE INVENTION

Problems to be Solved by the Invention

From the viewpoint of environmental protection, there has recently been a trend for the displacement of automobile engines to decrease, and when the number of engine cylinders decreases accompanying the decrease in displacement, the engine vibrational frequency decreases. As explained in the 'MODES FOR CARRYING OUT THE INVENTION' section of the present Description, when an attempt is made to damp low frequency vibration using a centrifugal pendulum damping device, since the amplitude of a plurality of inertial masses supported on a support body increases, in order to avoid interference between the inertial masses it is necessary to reduce the dimensions of the inertial masses, and because of this there is the problem that the damping performance of the centrifugal pendulum damping device is degraded.

The arrangement described in Patent Document 1 above is for improving the damping performance by making the natural frequency of the inertial mass always constant regardless of the amplitude, but since the problem of interference between the inertial masses caused by increase in amplitude cannot be solved, there is still the problem that the dimensions of the inertial mass become small and a sufficient damping performance cannot be obtained.

Furthermore, since the arrangement described in Patent Document 2 above requires a speed-increasing device with a complicated structure, such as a planetary gear mechanism, not only does the number of components increase, thus causing an increase in cost, but there is also the problem that the large size results in disadvantages in terms of weight and installation space.

The present invention has been accomplished in light of the above circumstances, and it is an object thereof to enhance the performance of a centrifugal pendulum damping device in damping low frequency vibration.

Means for Solving the Problems

In order to attain the above object, according to a first aspect of the present invention, there is provided a centrifugal pendulum damping device comprising a rotating shaft whose rotational speed varies, a support body that is provided on the rotating shaft, a plurality of inertial masses that are respectively supported on a plurality of regions divided in a peripheral direction of an outer peripheral part of the support body, a pair of first curved tracks that are provided in each of the plurality of regions of the support body, a pair of second curved tracks that are provided in each of the plurality of inertial masses and are curved in a direction opposite to that of the pair of first curved tracks, and a plurality of pins that are rollably fitted in a section where the first curved track and the second curved track intersect each other, a damping operation being exhibited by the inertial mass undergoing pendular oscillation in a trajectory according to the shape of the first and second curved tracks with respect to the support body, wherein the pair of first curved tracks have different shapes from each other, and the pair of second curved tracks have different shapes from each other.

Further, according to a second aspect of the present invention, in addition to the first aspect, the length of a first segment joining a center of the radius of curvature of one of the pair of first curved tracks and a center of the radius of curvature of one of the pair of second curved tracks is different from the length of a second segment joining a center of the radius of curvature of the other of the pair of first curved tracks and a center of the radius of curvature of the other of the pair of second curved tracks.

Furthermore, according to a third aspect of the present invention, in addition to the first or second aspect, the inertial mass has a larger mass for an outer end part thereof than for a middle part thereof.

A main shaft 12 of an embodiment corresponds to the rotating shaft of the present invention, and a secondary flywheel 14 of the embodiment corresponds to the support body of the present invention.

Effects of the Invention

In accordance with the first aspect of the present invention, a centrifugal pendulum damping device comprises a rotating shaft whose rotational speed varies, a support body that is provided on the rotating shaft, a plurality of inertial masses that are respectively supported on a plurality of regions divided in a peripheral direction of an outer peripheral part of the support body, a pair of first curved tracks that are provided in each of the plurality of regions of the support body, a pair of second curved tracks that are provided in each of the plurality of inertial masses and are curved in a direction opposite to that of the pair of first curved tracks, and a plurality of pins that are rollably fitted in a section where the first curved track and the second curved track intersect each other, and a damping operation is exhibited by the inertial mass undergoing pendular oscillation in a trajectory according to the shape of the first and second curved tracks with respect to the support body.

In this arrangement, since the shapes of the pair of first curved tracks are different from each other and the shapes of the pair of second curved tracks are different from each other, the inertial mass not only moves translationally in the peripheral direction of the support body but also moves rotationally, and this enables the damping performance to be improved by generating both a damping force due to translational movement and a damping force due to rotational movement. Furthermore, when the rotational variation frequency of the rotating shaft decreases, since it is necessary to decrease the natural frequency of oscillation of the inertial mass in response thereto, the amplitude increases and it easily extends outside the region of the support body; since the inertial mass moves rotationally accompanying translational movement, it is less likely to extend outside the region of the support body, and the inertial mass can be increased in size by a proportion corresponding to the above to thus increase the mass and the moment of inertia, thereby further improving the damping performance.

Furthermore, in accordance with the second aspect of the present invention, since the length of the first segment joining the center of the radius of curvature of one of the pair of first curved tracks and the center of the radius of curvature of one of the pair of second curved tracks is different from the length of the second segment joining the center of the radius of curvature of the other of the pair of first curved tracks and the center of the radius of curvature of the other of the pair of second curved tracks, it is possible to move the inertial mass translationally and rotationally.

Moreover, in accordance with the third aspect of the present invention, since the inertial mass has a larger mass for the outer end part than for the middle part, the moment of inertia becomes large, and the amount of energy absorbed when the inertial mass moves rotationally increases, thus improving the damping performance.

EXPLANATION OF REFERENCE NUMERALS AND SYMBOLS

12 Main shaft (rotating shaft)
14 Secondary flywheel (support body)
16 Inertial mass
22A First curved track
22B First curved track
23A Second curved track
23B Second curved track
24 Pin
A Center of radius of curvature of one first curved track
B Center of radius of curvature of other first curved track
C Center of radius of curvature of one second curved track
D Center of radius of curvature of other second curved track
S Region

MODES FOR CARRYING OUT THE INVENTION

A first embodiment of the present invention is explained below by reference to FIG. 1 to FIG. 6.

First Embodiment

Figure 1:
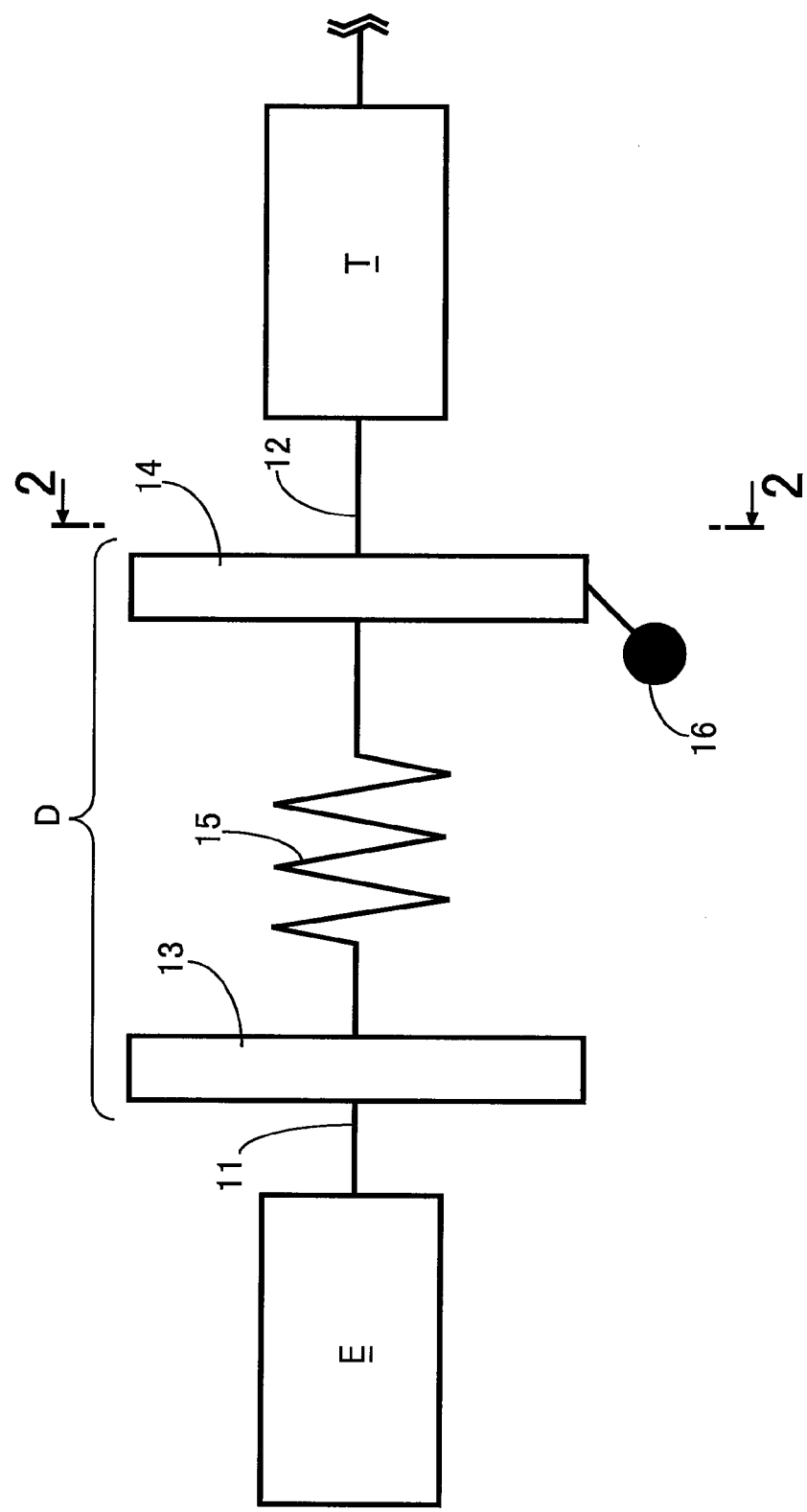
FIG. 1 is a schematic diagram of a damper disposed between an engine and a transmission. (first embodiment)
Figure 2:
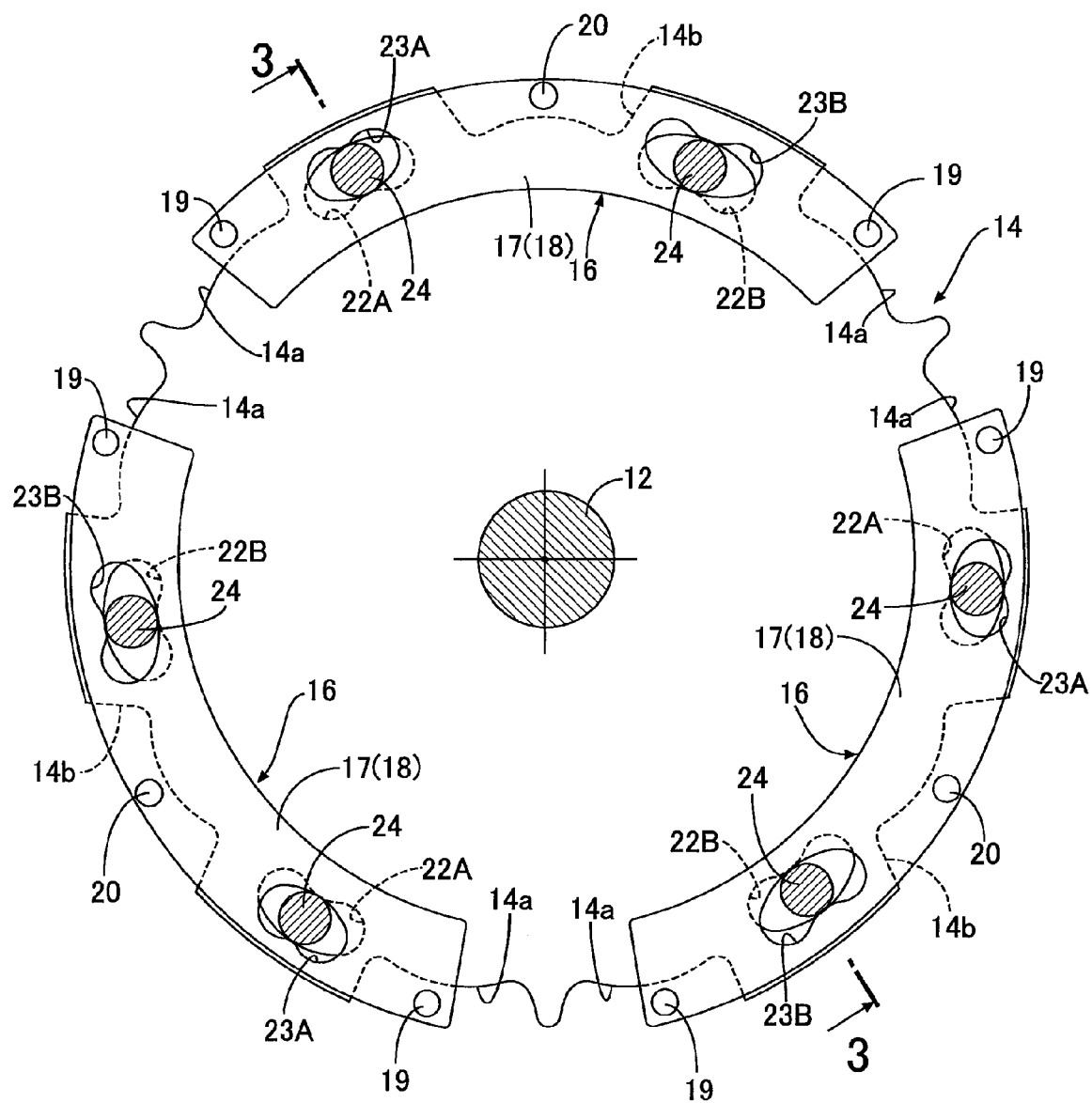
FIG. 2 is a view from arrowed line 2-2 in FIG. 1. (first embodiment)
Figure 3:
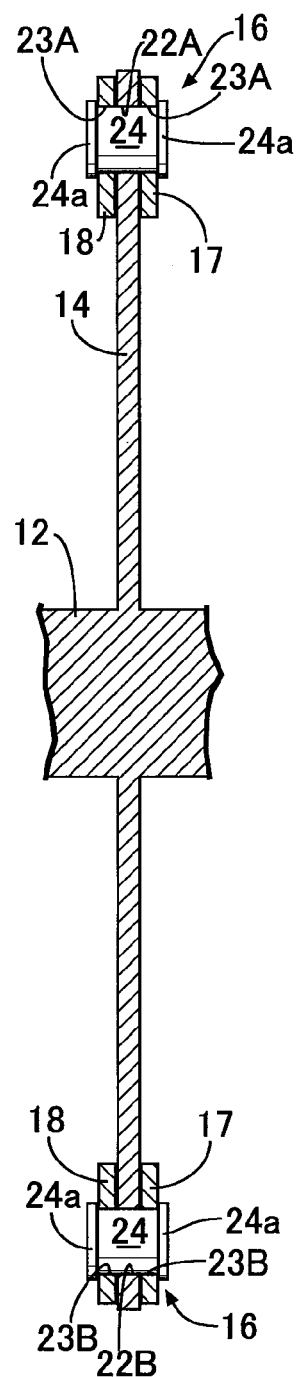
FIG. 3 is a sectional view along line 3-3 in FIG. 2. (first embodiment)
Figure 4:
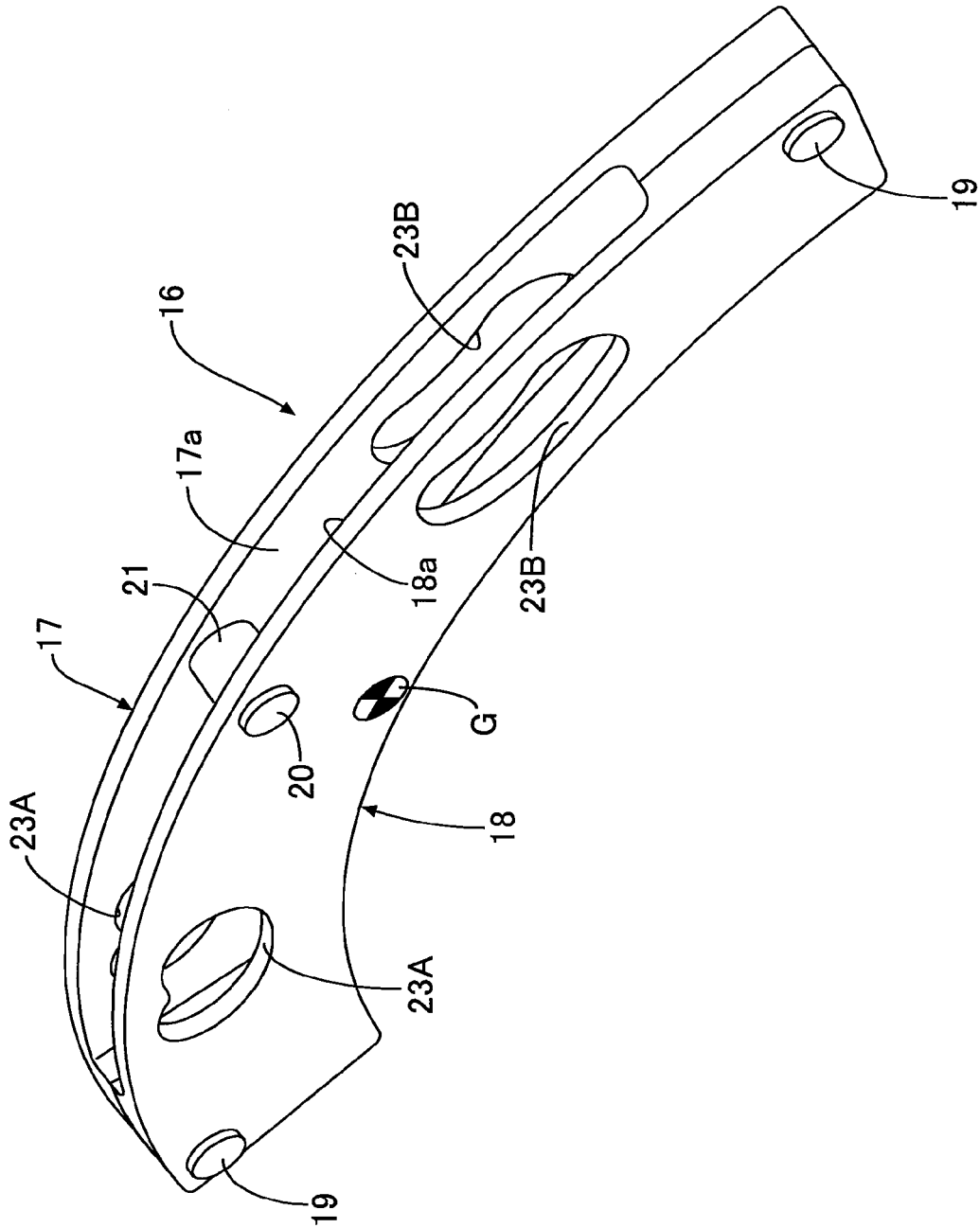
FIG. 4 is a perspective view of an inertial mass. (first embodiment)

As shown in FIG. 1, a damper D disposed between a crankshaft 11 of an automobile engine E and a main shaft 12 of a transmission T is formed from a primary flywheel 13 connected to the crankshaft 11, a secondary flywheel 14 connected to the main shaft 12, and a plurality of springs 15 providing a connection between the primary flywheel 13 and the secondary flywheel 14. The secondary flywheel 14, which forms a support body of the present invention, is provided with three inertial masses 16 acting as centrifugal pendulums, and the secondary flywheel 14 and the inertial masses 16 form a centrifugal pendulum damping device.

As shown in FIG. 2 to FIG. 6, the secondary flywheel 14 is a disk-shaped member with the main shaft 12 as the center, and the three fan-shaped inertial masses 16 are supported on an outer peripheral part of the secondary flywheel 14 at intervals of 120°. All of the three fan-shaped inertial masses 16 have the same structure and are formed by integrally joining a first half body 17 and a second half body 18 using three rivets 19, 19, and 20. The first half body 17 and the second half body 18 abut against each other in opposite end parts, which are joined by the two rivets 19 and 19, but in a middle part, that is, a part other than the opposite end parts, recess portions 17a and 18a are formed on mutually opposing faces, and the middle rivet 20 is provided with a collar 21 fitted into the recess portions 17a and 18a and functioning as a spacer. Due to the recess portions 17a and 18a being formed in the middle parts of the first half body 17 and the second half body 18, the mass of the opposite end parts, which are far from the center of gravity G of the inertial mass 16, increases, and the moment of inertia around the center of gravity G increases.

A pair of arc-shaped second curved tracks 23A and 23B extend through two positions, sandwiching the center of gravity G, of the first half body 17 and the second half body 18 of the inertial mass 16. The center of the radius of curvature of one (left side in the figure) second curved track 23A is defined as C, the center of the radius of curvature of the other (right side in the figure) second curved track 23B is defined as D, and these centers C and D are both on the radially outer side of the inertial mass 16.

The outer peripheral part of the secondary flywheel 14 is divided into three regions S having a central angle of 120°, and one inertial mass 16 is supported on each region S. A pair of arc-shaped first curved tracks 22A and 22B extend through the region S of the secondary flywheel 14. The center of the radius of curvature of one (left side in the figure) first curved track 22A is defined as A, the center of the radius of curvature of the other (right side in the figure) first curved track 22B is defined as B, and these centers A and B are both on the radially inner side of the inertial mass 16.

With regard to the inertial mass 16, the first half body 17 and the second half body 18 thereof are supported so as to sandwich the secondary flywheel 14, and in this arrangement in order to avoid interference with the rivets 19 and 19 at opposite ends of the inertial mass 16, cutouts 14a and 14a are formed in opposite end parts on the outer periphery of the region S of the secondary flywheel 14, and in order to avoid interference with the middle rivet 20 of the inertial mass 16 a cutout 14b is formed in a middle part of the region S of the secondary flywheel 14.

A pin 24 rollably extends through a part where one first curved track 22A and one second curved track 23A intersect each other, and a pin 24 rollably extends through a part where the other first curved track 22B and the other second curved track 23B intersect each other. Flanges 24a are formed at opposite ends of these pins 24 and 24 to stop them falling out.

The operation of the embodiment of the present invention having the above arrangement is now explained.

The rotational angular velocity of the crankshaft 11 of the engine E is not constant; it decreases in the compression stroke and increases in the expansion stroke, and vibration with a frequency proportional to the engine rotational speed is generated. This vibration of the crankshaft 11 is damped by extension/compression of the springs 15 disposed between the primary flywheel 13 and the secondary flywheel 14 of the damper D and is also damped by a pendulum action of the inertial masses 16 provided on the secondary flywheel 14.

That is, in general, a pendulum is urged vertically downward by virtue of gravity and oscillates, the inertial masses 16 of the centrifugal pendulum damping device are urged radially outward by virtue of centrifugal force and oscillate, and making the natural frequency of oscillation of the inertial masses 16 coincide with the vibrational frequency of the engine E that is to be damped enables a damping function as a dynamic damper to be exhibited.

Figure 8:
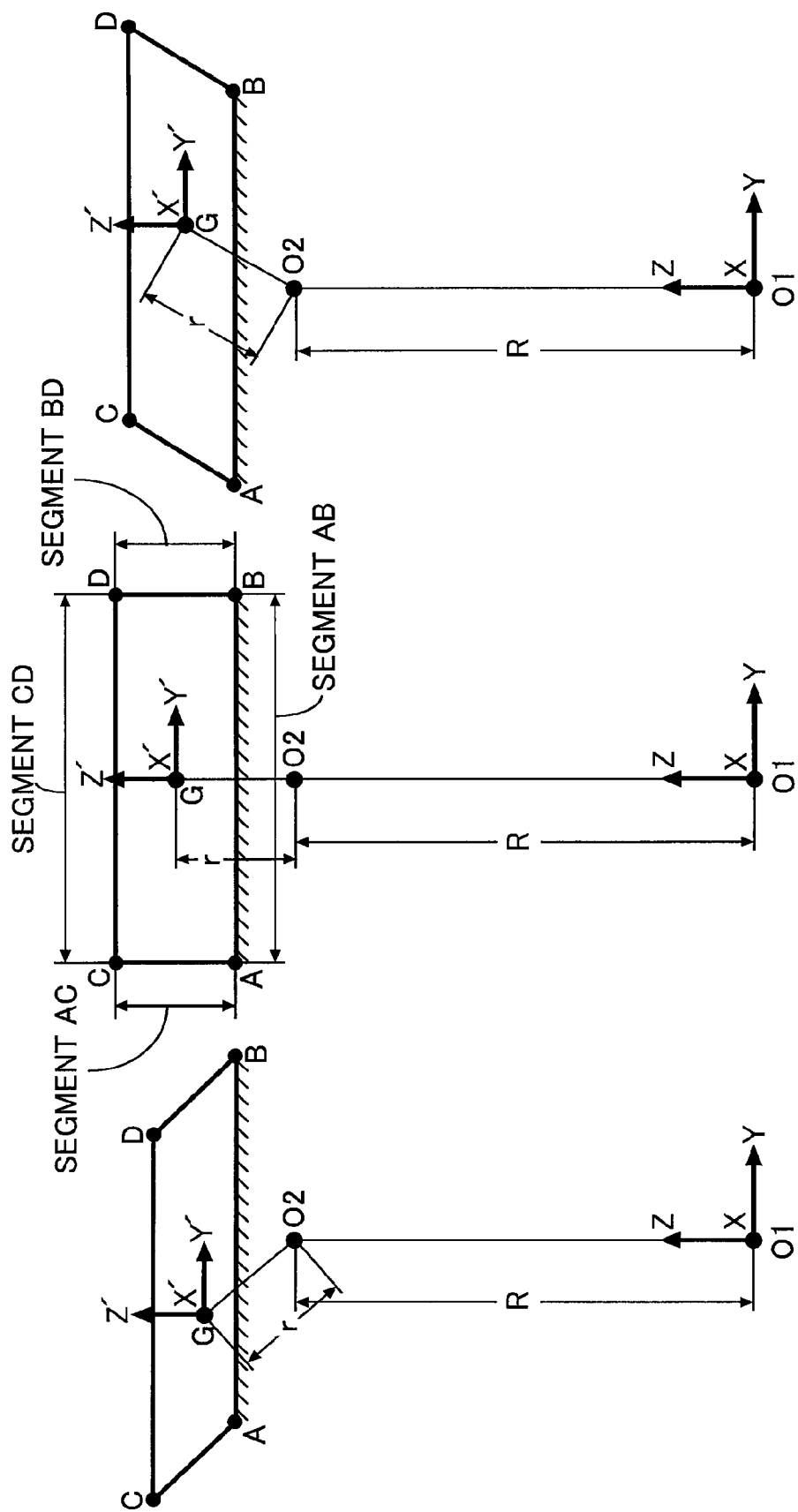
FIG. 8 is a diagram for explaining the operation of a four-bar linkage. (Comparative Example)

FIG. 8 explains the trajectory of movement of an inertial mass 16 of a centrifugal pendulum damping device of a Comparative Example. In the centrifugal pendulum damping device of the Comparative Example, the center of curvature of one second curved track 23A of the inertial mass 16 is defined as C, the center of curvature of the other second curved track 23B is defined as D, the center of curvature of one first curved track 22A of a secondary flywheel 14 is defined as A, and the center of curvature of the other first curved track 22B is defined as B. The shapes of the first curved tracks 22A and 22B and the second curved tracks 23A and 23B are set so that segment AC=segment BD and segment AB=segment CD always hold, so that the rectangle ACDB always forms a parallel four-bar linkage even when the inertial mass 16 undergoes pendular oscillation.

As a result, the inertial mass 16 does not move rotationally with respect to the secondary flywheel 14 but only moves translationally. Furthermore, when the center of a main shaft 12 is defined as O1 and the center of pendular oscillation of the inertial mass 16 is defined as O2, the position of O2 is unchanged; even if the inertial mass 16 undergoes pendular oscillation, a radius R between the center O1 and the center O2 is constant, and a radius r between the center O2 and the center of gravity G is constant.

Figure 9:
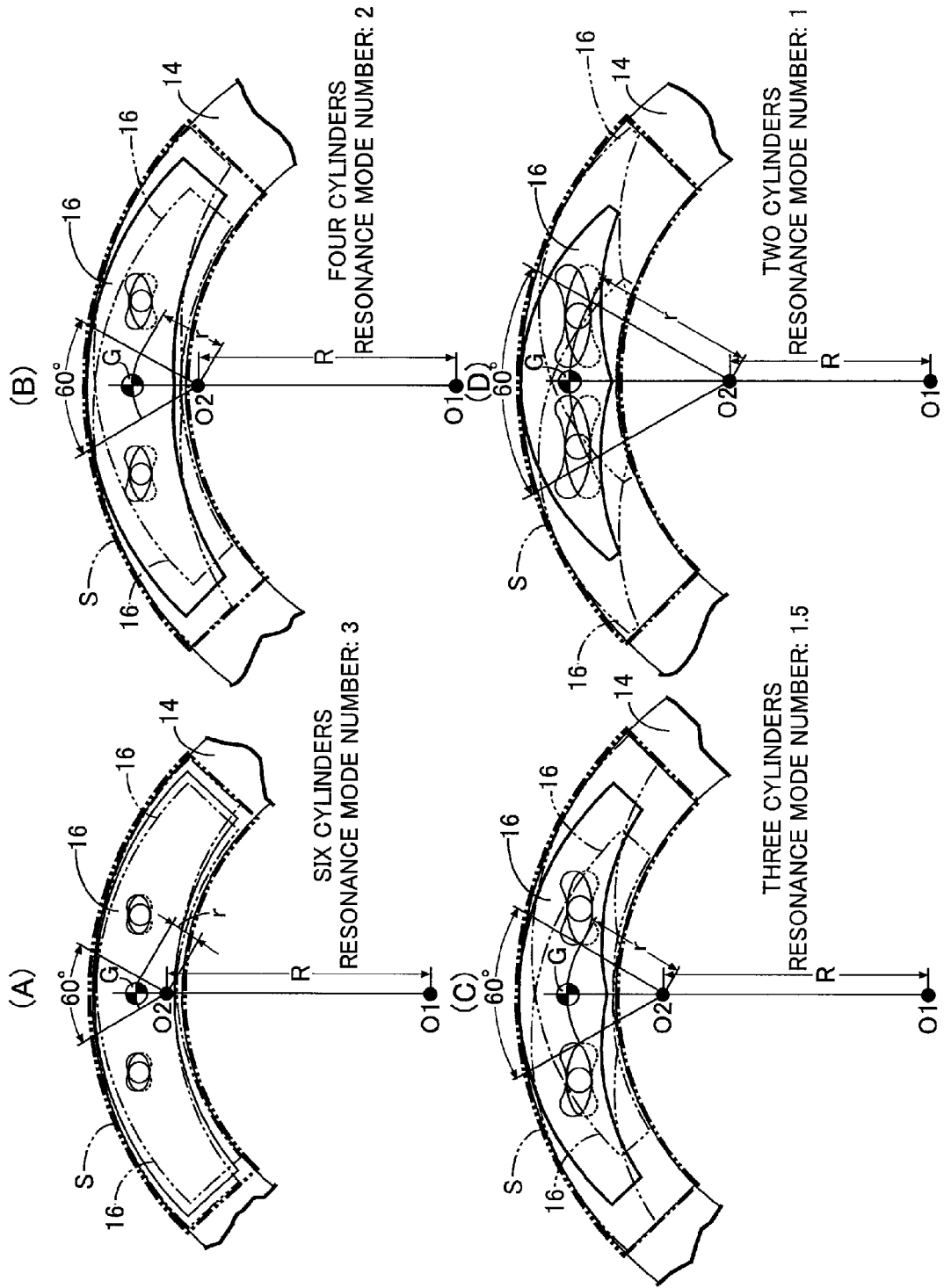
FIG. 9 is a diagram showing the range of movement of an inertial mass. (Comparative Example)

FIG. 9 shows the shape of the inertial mass 16 of the centrifugal pendulum damping device of the Comparative Example; FIG. 9 (A) corresponds to a six cylinder engine, FIG. 9 (B) corresponds to a four cylinder engine, FIG. 9 (C) corresponds to a three cylinder engine, and FIG. 9 (D) corresponds to a two cylinder engine. A four cycle engine fires once every two rotations of a crankshaft; in order for the centrifugal pendulum damping device to exhibit an effective damping function, it is necessary for the natural frequency of oscillation of the inertial mass 16 to be synchronized with the vibrational frequency of the engine, and it is therefore necessary for a rotational speed ω of the engine and a natural frequency λ of oscillation of the inertial mass 16 to satisfy the relationship below.

$$\lambda = \omega \times \sqrt{(R/r)} \tag{1}$$

Here, R is the radius between the center O1 of the main shaft 12 and the center O2 of pendular oscillation of the inertial mass 16, and r is the radius between the center O2 of pendular oscillation of the inertial mass 16 and the center of gravity G of the inertial mass 16.

In the case of the six cylinder engine of FIG. 9 (A), since three oscillations are generated for every rotation of the engine, it is necessary to set resonance mode number $\sqrt{(R/r)}=3$, that is R=9r. In the case of the four cylinder engine of FIG. 9 (B), since two oscillations are generated for every rotation of the engine, it is necessary to set resonance mode number engine $\sqrt{(R/r)}=2$, that is R=4r. In the case of the three cylinder engine of FIG. 9 (C), since three oscillations are generated for every two rotations of the engine, it is necessary to set resonance mode number $\sqrt{(R/r)}=3/2$, that is R=(9/4)r. In the case of the two cylinder engine of FIG. 9 (D), since one oscillation is generated for every rotation of the engine, it is necessary to set resonance mode number $\sqrt{(R/r)}=1$, that is R=r.

Furthermore, since a plurality of inertial masses 16 are supported on the secondary flywheel 14, in order to avoid interference between these inertial masses 16 when they undergo pendular oscillation, it is necessary for each inertial mass 16 not to extend outside a fan-shaped region S set on the secondary flywheel 14.

However, since the radius r between the center O2 of pendular oscillation of the inertial mass 16 and the center of gravity G of the inertial mass 16 becomes comparatively large in response to a decrease in the number of engine cylinders, for example, in order to ensure that a swing angle of the center of gravity G of the inertial mass 16 is 60° the distance of movement in the peripheral direction of the inertial mass 16 increases according to a decrease in the number of cylinders. Moreover, since the inertial mass 16 of the Comparative Example moves translationally without moving rotationally, when the inertial mass 16 undergoes pendular oscillation, it easily extends outside the region S, and in order to prevent it from extending outside it becomes necessary to further reduce the dimensions of the inertial mass 16 as the number of cylinders further decreases. This is clear by comparing the dimensions of the inertial mass 16 in the case of the six cylinder engine of FIG. 9 (A) and the dimensions of the inertial mass 16 in the case of the two cylinder engine of FIG. 9 (D).

Figure 5:
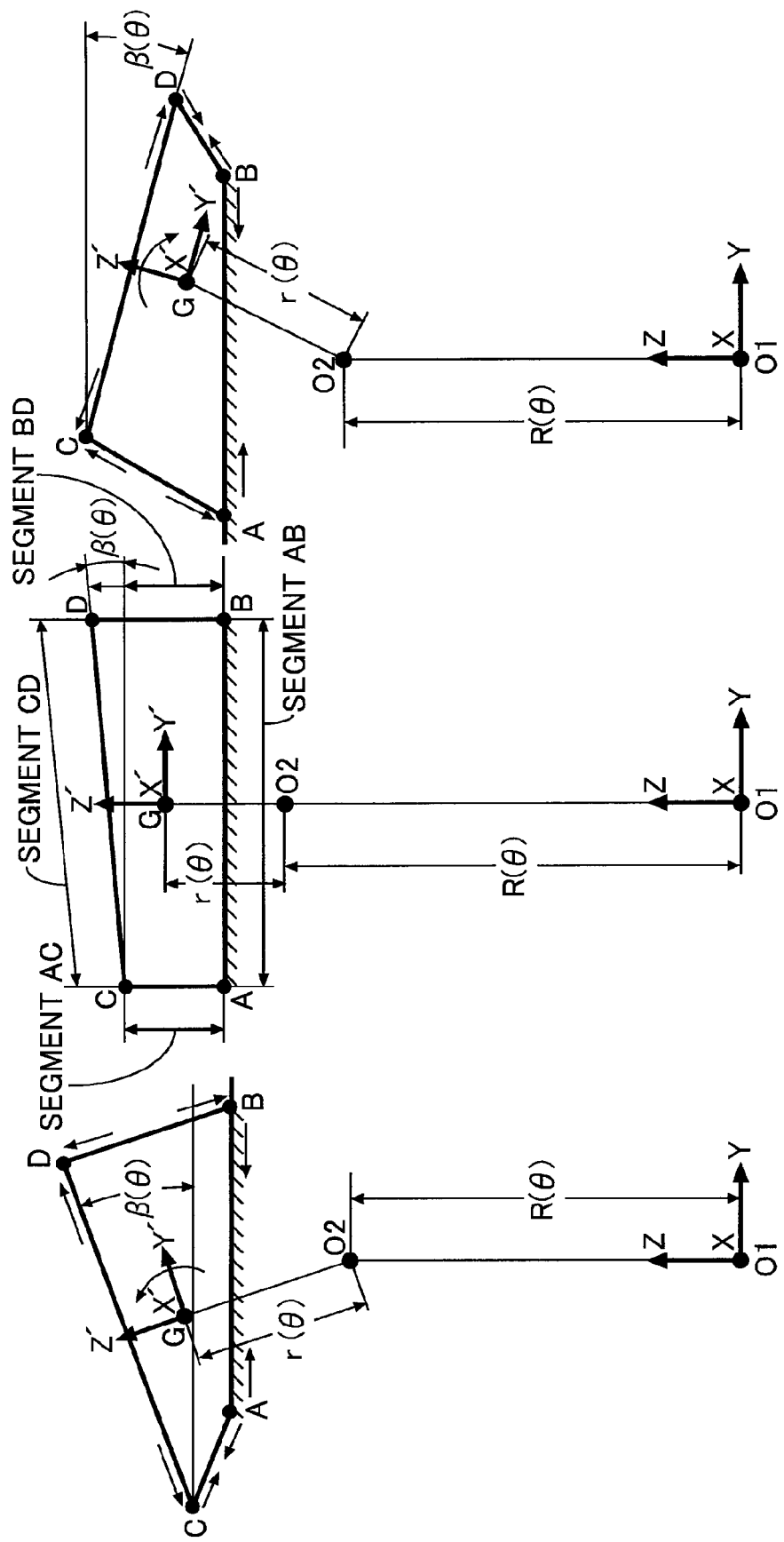
FIG. 5 is a diagram for explaining the operation of a four-bar linkage. (first embodiment)

On the other hand, FIG. 5 explains the trajectory of movement of the inertial mass 16 of the centrifugal pendulum damping device of the embodiment; the shapes of the first curved tracks 22A and 22B and the second curved tracks 23A and 23B are set such that a rectangle ACDB forms a non-parallel four-bar linkage when the inertial mass 16 moves, that is, they are set so that segment AC≠segment BD and segment AB≠segment CD holds. As a result, the inertial mass 16 moves translationally with respect to the secondary flywheel 14 and at the same time moves rotationally around the center of gravity G.

Here, the center of the main shaft 12 is defined as O1 and the center of pendular oscillation of the inertial mass 16 is defined as O2; when the position of O2 changes and, therefore the inertial mass 16 undergoes pendular oscillation, the radius R between the center O1 and the center O2 changes, and the radius r between the center O2 and the center of gravity G changes. In other words, when an angle formed between a direction joining the center O1 and the center O2 and a direction joining the center O2 and the center of gravity G is defined as a swing angle θ of the inertial mass 16, the rotational angle β (angle of inclination of segment AB), the radius R, and the radius r of the inertial mass 16 are a function of the swing angle θ.

Figure 6:
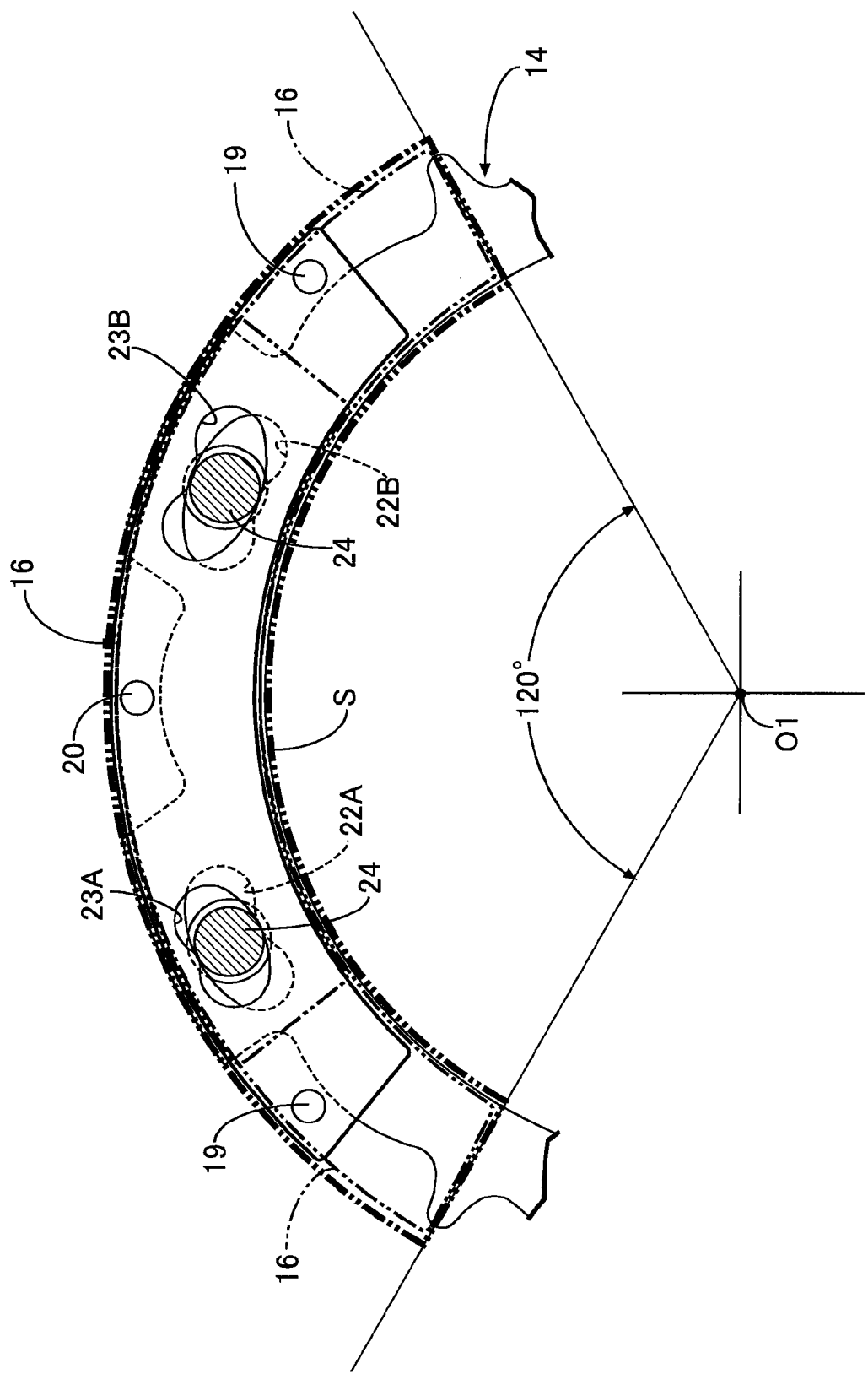
FIG. 6 is a diagram showing the range of movement of the inertial mass. (first embodiment)

FIG. 6 shows the range of movement of the inertial mass 16 of the embodiment; when it moves from a middle position denoted by the solid line to opposite end positions in the peripheral direction denoted by the chain line, the inertial mass 16 moves rotationally around the center of gravity G in addition to undergoing translational movement. That is, when the inertial mass 16 moves leftward in the figure it rotates in the counterclockwise direction, and when it moves rightward in the figure it rotates in the clockwise direction; the inertial mass 16 moves along the fan-shaped region S, and the inertial mass 16 is prevented from extending outside the region S without its dimensions being reduced. In this way, in accordance with the present embodiment, even when the number of cylinders of the engine E decreases and it is necessary to reduce the resonance mode number, due to the inertial mass 16 carrying out translational movement and rotational movement at the same time, it becomes harder for the inertial mass 16 to extend outside the region S, thereby making it possible to ensure the mass by maximizing the dimensions of the inertial mass 16 and thus enhancing the damping effect.

Furthermore, since the inertial mass 16 of the Comparative Example only carries out translational movement and does not carry out rotational movement, a damping effect from its moment of inertia cannot be obtained, but since the inertial mass 16 of the present embodiment carries out rotational movement in addition to translational movement, a damping effect can be obtained from its moment of inertia. In this process, the moment of inertia is increased by increasing the thickness of the opposite end parts, which are far from the center of gravity G of the first and second half bodies 17 and 18 of the inertial mass 16, thereby further enhancing the damping effect from the moment of inertia.

In the present embodiment, since the rotational angle β, the radius R, the radius r, etc. of the inertial mass 16 change in response to pendular oscillation of the inertial mass 16, that is, in response to change in the swing angle θ of the inertial mass 16, in place of the equation (1) above, it is necessary for the relationship $$\lambda = \omega \times \sqrt{(G(\theta)/D(\theta))} \qquad (2)$$

to hold. Here, G(θ) is the centrifugal force term of the equation of motion of the inertial mass 16, and D(θ) is the inertial term of the equation of motion of the inertial mass 16.

In accordance with the present embodiment, since the moment of inertia of the inertial mass 16 is increased to thus increase the inertial term D(θ) of Equation (2) and decrease the resonance mode number $\sqrt{(G(\theta)/D(\theta))}$, the natural frequency of oscillation of the inertial mass 16 of the centrifugal pendulum damping device is decreased, thus enabling it to cope with a decrease in the number of cylinders of the engine E.

As hereinbefore described, in accordance with the present embodiment, the inertial mass 16 undergoes rotational movement in addition to translational movement, thereby ensuring that the dimensions (mass) of the inertial mass 16 are maximized to thus enhance the damping performance, and due to the damping effect being exhibited accompanying the rotational movement, the damping performance can be further enhanced.

Figure 7:
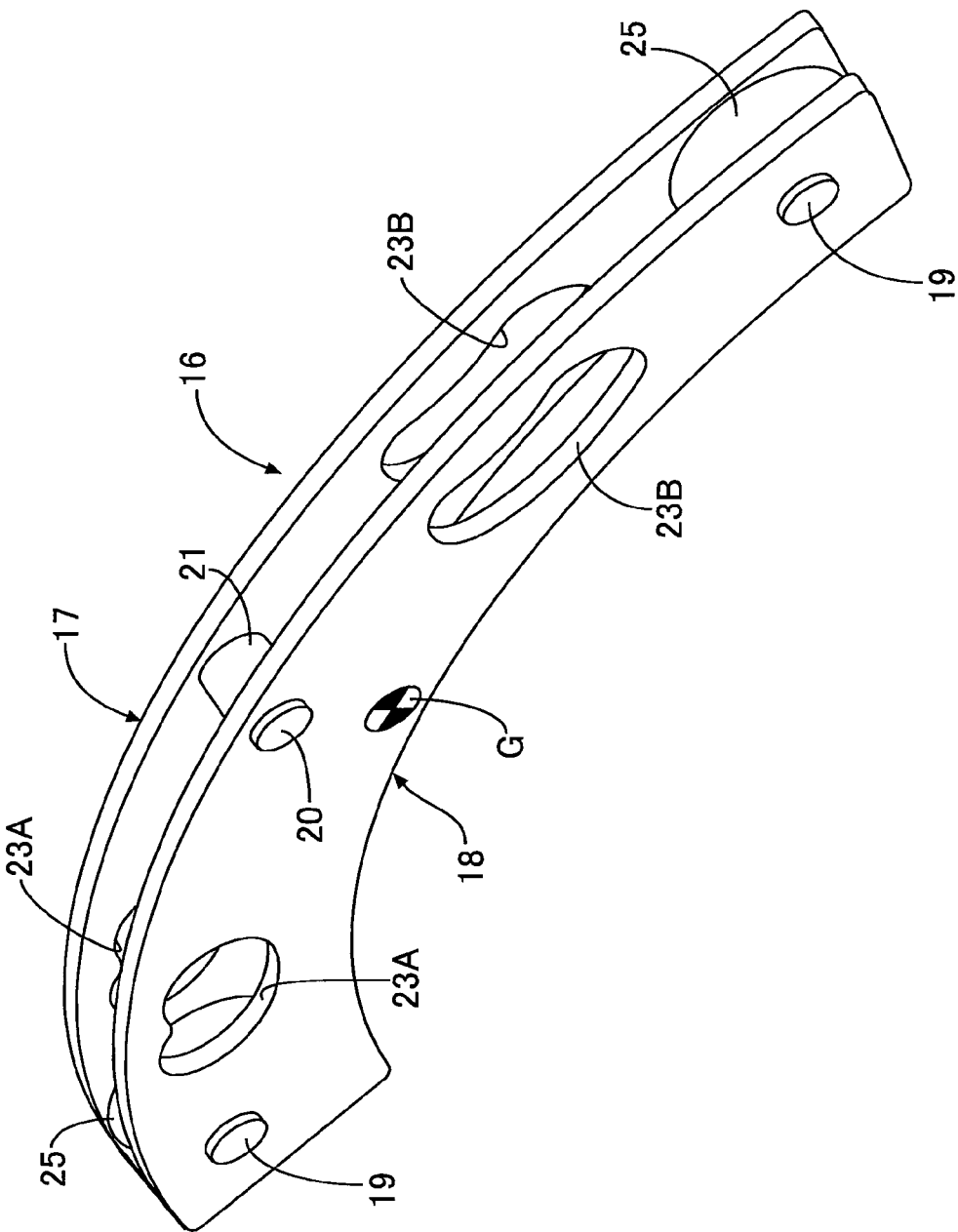
FIG. 7 is a perspective view of an inertial mass. (second embodiment)

A second embodiment of the present invention is now explained by reference to FIG. 7.

Second Embodiment

As is clear from a comparison of the first embodiment (see FIG. 4) with a second embodiment (see FIG. 7), in the first embodiment the thickness of the first and second half bodies 17 and 18 is increased for the opposite end parts, which are far from the center of gravity G of the inertial mass 16 to thus increase the moment of inertia, but in the second embodiment, while keeping the thickness of first and second half bodies 17 and 18 constant, weights 25 and 25 formed from a metal having a high specific gravity such as tungsten or lead are supported on rivets 19 and 19 on opposite end parts far from the center of gravity G, thus increasing the moment of inertia. The weights 25 and 25 also function as collars for maintaining a constant distance between the first and second half bodies 17 and 18.

In accordance with the second embodiment, the same operational effects as those of the first embodiment can also be achieved.

Embodiments of the present invention are explained above, but the present invention may be modified in a variety of ways as long as the modifications do not depart from the spirit and scope thereof.

For example, in the embodiments a non-parallel four-bar linkage is set so that segment AC≠segment BD and segment AB≠segment CD hold, but as long as segment AC≠segment BD holds, it is not always necessary for segment AB≠segment CD to hold.

Furthermore, the rotating shaft of the present invention is not limited to the main shaft 12 of the embodiment.

Moreover, the support body of the present invention is not limited to the secondary flywheel 14 of the embodiment.

Furthermore, the number of inertial masses 16 is not limited to three as in the embodiment.

Moreover, the primary flywheel 13 and the secondary flywheel 14 of the damper D of the embodiment are not necessarily arranged side by side in the axial direction, and may be disposed on the inside and the outside in the radial direction.

Furthermore, the centrifugal pendulum damping device of the present invention may be disposed so as to be separated from the damper D, which is formed from the primary flywheel 13, the secondary flywheel 14, and the springs 15.

The invention claimed is:

1. A centrifugal pendulum damping device comprising:
a rotating shaft whose rotational speed varies;
a support body that is provided on the rotating shaft;
a plurality of inertial masses respectively supported on a plurality of regions divided in a peripheral direction of an outer peripheral part of the support body;
a pair of first curved tracks provided in each of the plurality of regions of the support body;
a pair of second curved tracks provided in each of the plurality of inertial masses and curved in a direction opposite to that of the pair of first curved tracks; and
a plurality of pins rollably fitted in a section where the pair of first curved tracks and the pair of second curved tracks intersect each other, a damping operation being exhibited by the plurality of inertial masses undergoing pendular oscillation in a trajectory according to the shape of the pair of first curved tracks and the pair of second curved tracks with respect to the support body, wherein the pair of first curved tracks have different shapes from each other, and the pair of second curved tracks have different shapes from each other.

2. The centrifugal pendulum damping device according to claim 1, wherein the length of a first segment joining a center of the radius of curvature of one of the pair of first curved tracks and a center of the radius of curvature of one of the pair of second curved tracks is different from the length of a second segment joining a center of the radius of curvature of the other of the pair of first curved tracks and a center of the radius of curvature of the other of the pair of second curved tracks.

3. The centrifugal pendulum damping device according to claim 2, wherein each of the plurality of inertial masses has a larger mass for an outer end part thereof than for a middle part thereof.

4. The centrifugal pendulum damping device according to claim 1, wherein each of the plurality of inertial masses has a larger mass for an outer end part thereof than for a middle part thereof.

\* \* \* \* \*